(12) United States Patent
Hahka

(10) Patent No.: US 6,193,261 B1
(45) Date of Patent: Feb. 27, 2001

(54) QUICK RELEASE HITCH PIN

(76) Inventor: Duane E. Hahka, Rte. 1, Box 196A, Atlantic Mine, MI (US) 49905

( * ) Notice: Subject to any disclaimer, the term of this patent is extended or adjusted under 35 U.S.C. 154(b) by 0 days.

(21) Appl. No.: 09/404,244

(22) Filed: Sep. 22, 1999

(51) Int. Cl.$^7$ .................................................. B60D 1/02
(52) U.S. Cl. ............................ 280/515; 24/453; 70/258; 280/507; 411/345
(58) Field of Search .................................. 280/515, 506, 280/507; 70/14, 34, 258, 386; 24/453; 411/348, 351, 345; 403/328

(56) References Cited

U.S. PATENT DOCUMENTS

| 1,242,256 | * | 10/1917 | Staack | 70/14 |
|---|---|---|---|---|
| 4,988,248 | * | 1/1991 | Flux | 280/507 |
| 5,199,733 | * | 4/1993 | DeLorme | 280/515 |
| 5,222,755 | * | 6/1993 | O'Neal | 280/507 |
| 5,517,734 | * | 5/1996 | Korpi | 280/515 |

FOREIGN PATENT DOCUMENTS

| 1243530 | * | 6/1967 | (AT) | 280/515 |
|---|---|---|---|---|
| 938288 | * | 12/1955 | (DE) | 280/515 |
| 250663 | * | 4/1926 | (GB) | 280/515 |
| 431061 | * | 2/1948 | (IT) | 280/515 |

* cited by examiner

Primary Examiner—Anne Marie Boehler
(74) Attorney, Agent, or Firm—George L. Williamson

(57) ABSTRACT

The present invention discloses a quick release hitch pin which comprises an elongated member having a handle thereon which includes a locking assembly. The elongated member has a rod disposed in a central bore spring tensioned outwardly having a plunger on its inner end positioned between a pair of balls positioned in apertures which balls are urged outwardly by the plunger. As the balls are urged outwardly they form a locking member against the underside of the tow bar thereby preventing removal of the elongated member or pin. Alternative embodiments disclose a pair of tabs communicating with the lower portion of a looped rod, with the tabs having tangs thereon which tangs contact the underside of the tow bar when in the extended position thereby preventing removal of the elongated member.

5 Claims, 1 Drawing Sheet

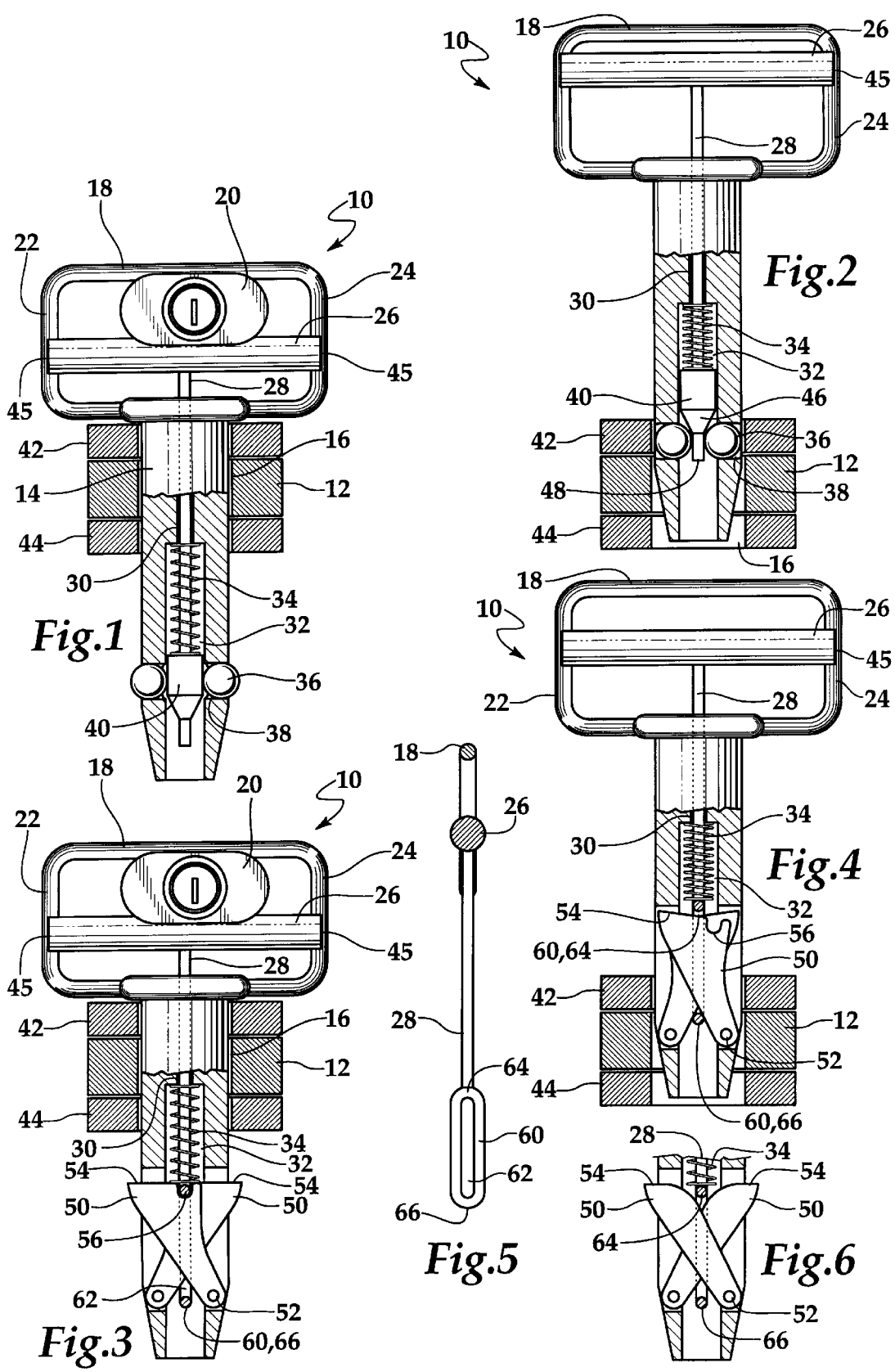

QUICK RELEASE HITCH PIN

BACKGROUND OF THE INVENTION

1. Field of the Invention

The present invention relates generally to trailer hitch pins and, more particularly, is concerned with a quick release trailer hitch pin.

2. Description of the Prior Art

Trailer hitches and trailer hitch pins have been described in the prior art. However, none of the prior art devices disclose the unique features of the present invention.

In U.S. Pat. No. 5,048,854, dated Sep. 17, 1997, Clark disclosed a winch-driven hitch system for coupling trailers to tow vehicles. The system comprises a unitary frame pivotally mounted beneath the bumper of the vehicle by a rigid pivot shaft, which projects upwardly from the center of the frame. A rigid base defines a tubular cavity and a platform for mounting a winch adjacent of the cavity. The cavity slidably receives a rigid bar coupled to the trailer. Deflectors project angularly outwardly from the cavity to define a mouth for guiding the bar into alignment as it penetrates the mouth. The frame rotates in response to pressure applied by the cable when the trailer is drawn from either side of the two vehicles. The bar comprises a tapered end, a locking orifice defined centrally through the bar, and an orificed end for receiving a trailer connector. A rigid travel-limiting stop projects upwardly between the locking orifice and the orificed end. The stop limits travel of the bar relative to the mouth to assure proper coupling. The frame pivots roughly sixty-five degrees relative to the longitudinal axis of the cavity. Rotation of the frame is limited by a rigid stop projecting upwardly from the frame. The winch cable is anchored by a hand-tied knot to facilitate repair if broken. A drop pin and a cotter pin assembly are provided to assure safe coupling and to prevent frame rotation during travel. Electrical controls for the winch are mounted remote from the hitching zone.

In U.S. Pat. No. 4,196,919, dated Apr. 8, 1980, Tomen disclosed a hitch assembly which readily attaches itself to the bumper of an automobile and simultaneously secures the cross bar or draft bar of the hitch in a manner which requires no threading devices to obtain the securing action. In fact, the securing action is by the simple movement of a lever into an over centered position on the hitch assembly and this in cooperation with two chains thereof, one attached to the upper margin and the other attached to the lower margin of the bumper or possibly the frame of the car securingly clasps not only the hitch assembly to the bumper but the draft bar to the hitch assembly. Preferably hitch assemblies are provided one at each end of the cross or draft bar. Thus with "snaps" of each lever into over center position the bumper hitch is secured to the automobile awaiting for connection of the trailer tow bar thereof for coupling to an awaiting trailer.

In U.S. Pat. No. 5,890,727, dated Apr. 6, 1999, May disclosed a trailer hitch assembly that includes a hitch mount member having a chassis mount plate, a hitch mount plate having a plate mounting aperture bored entirely therethrough and four spaced alignment bores formed therein, and an extension arm in connection between the chassis mount plate and the hitch mount plate, a multi-ball hitch unit including a cross-shaped ball support structure including four support arms extending radially outward from a center portion having a structure mounting aperture formed therethrough; three trailer mount balls, each secured to the end of one of the remaining one of the four support arms; and a positioning mechanism including a bolt assembly including a bolt having a cap portion and a threaded shaft portion; a securing nut threadable onto an end of the threaded shaft portion; a biasing spring; and two alignment pins, the alignment pins extending perpendicularly with respect to two of the four support arms and being positioned in a manner such that when the plate mounting aperture and the structure mounting aperture are in alignment the alignment pins are positionable in registration with two of the four spaced alignment bores, the biasing spring being positioned between the mounting plate and the support structure, the threaded portion of the bolt being positioned through the plate mounting aperture, the securing nut being threaded onto an end of the threaded shaft portion.

In U.S. Pat. No. 5,887,885, dated Mar. 30, 1999, Byers, et al., disclosed a self-locking trailer hitch assembly which includes an elongated housing attachable to the draw bar of a towed vehicle, and the housing includes an attachment end and an opposite socket which is shaped to receive a vertically-projecting ball member. The ball member is mounted to the draw bar at the rear of the towing vehicle. Disposed within the housing adjacent the socket is a jaw pivotable on a horizontal axis so that the jaw can be pivoted to a ball locking position for holding and retaining the ball member within the socket and also pivotable to a ball releasing position for unlocking and releasing the ball member from the socket so that the towed vehicle can be uncoupled from the towing vehicle. A unique releasing function is provided by a manually operable latch which disengages the jaw from the ball locking position in order to facilitate removal of the ball member from the socket, but manual operation of the latch is In U.S. Pat. No. 4,811,967, dated Mar. 14, 1989, Hensley disclosed a hitch for connecting a trailer to a tow vehicle which includes a hitch bar which projects from the tow vehicle and a hitch box which receives the end of the hitch bar and is coupled to one trailer through a hitch ball and a socket-type coupler. The hitch bar has a shank provided along its four sides with beveled surfaces that are presented outwardly and rearwardly. The hitch box, on the other hand, h as a box-like enclosure provided with a forwardly presented open end through which the shank of the hitch bar projects. The enclosure furthermore contains beveled surfaces, which conform to the beveled surfaces on the hitch bar shank and indeed seat against those surfaces when the hitch bar is fully inserted into the hitch box. The beveled surfaces of the hitch bar and box are maintained in this seated condition by over center clamps, and when so seated, the hitch box will not shift relative to the hitch bar. The beveled surfaces however facilitate connecting the hitch bar to the hitch box while the latter is coupled to the trailer, for they guide the hitch box into precise alignment with the hitch bar when the hitch bar is forced rearwardly into the hitch box.

In U.S. Pat. No. 5,067,742, dated Nov. 26, 1991, Rely disclosed a quick hitch coupling apparatus for coupling a trailer provided with a hitch coupler and a vehicle provided with a tow bar receiver channel, includes a hitch sleeve and a tow bar. The hitch sleeve is fit slidably over the receiver channel of the vehicle and is releasably secured thereto. The tow bar is releasably and pivotally connected to the hitch sleeve at one end, and is provided with a hitch ball at its opposite end. The hitch ball is moved laterally from side to side to the position the ball beneath the hitch coupler of the trailer. It may be necessary to move the tow vehicle forward or rearward a short distance to position the tow bar ball directly beneath the trailer coupling. The trailer is then connected to the hitch ball, and the vehicle is moved forward to straighten the connections between the vehicle, the tow bar, and the trailer. The user then releases the connections between the hitch sleeve and receiver channel, and the hitch sleeve and the tow bar, and continues to back the vehicle toward the trailer to insert the tow bar into the receiver channel. The user then releasably secures the hitch sleeve to the receiver channel, and the receiver channel to the tow bar, to establish a connection between the trailer and vehicle that is equivalent to the connection provided by conventional receiver channel type trailer hitch assemblies.

In U.S. Pat. No. 4,548,423, dated Oct. 22, 1985, Craven disclosed a connecting device for joining a trailer to a towing vehicle for substantial horizontal and vertical pivotal movements, as well as longitudinal rotation, of the trailer relative to the towing vehicle. A shaft added to one yoke of a pair of yokes comprising a universal joint is journalled in a block for rotation through 360 degrees. A similar shaft having a stop at its outer end and secured to the other yoke of the universal joint is inserted into a split block, which functions as a quick-release clamping device upon closing of the block to secure the shaft. The bearing block preferably is affixed to the tongue or tow bar of the trailer and the split block is secured to the towing vehicle, the connecting device may be reversed end-for-end.

In U.S. Pat. No. 5,893,575, dated Apr. 13, 1999, Larkin disclosed a hitch assembly which is provided with a hitch mount and a safety chain connector, both of which adjust to provide a hitch assembly which conforms substantially to the contour of the towing vehicle body when the hitch assembly is not in use. The hitch mount is configured for retractable extension from a hitch base plate, providing a seat for a matching trailer mount. The safety chain connector is configured to selectively provide a seat for a trailer-connected safety chain. The hitch base plate attaches to the towing vehicle body, defining a support surface which is contoured substantially similar to the body contour of the towing vehicle. The hitch mount and safety chain connector are adjustable such that the hitch assembly may be conformed generally to the body contour of the towing vehicle, thus minimizing any interference with the vehicle's use.

While these trailer hitches and trailer hitch pins may be suitable for the purposes for which they were designed, they would not be as suitable for the purposes of the present invention, as hereinafter described.

SUMMARY OF THE INVENTION

The present invention discloses a quick release hitch pin which comprises an elongated member having a handle thereon which includes a locking assembly. The elongated member has a rod disposed in a central bore spring tensioned outwardly having a plunger on its inner end positioned between a pair of balls positioned in apertures which balls are urged outwardly by the plunger. As the balls are urged outwardly they form a locking member against the underside of the tow bar thereby preventing removal of the elongated member or pin. Alternative embodiments disclose a pair of tabs communicating with the lower portion of a looped rod, with the tabs having tangs thereon which tangs contact the underside of the tow bar when in the extended position thereby preventing removal of the elongated member.

An object of the present invention is to provide a hitch pin which can be securely locked inside of a trailer hitch. A further object of the present invention is to provide a secure lock assembly which can be easily and quickly unlocked by using a locking assembly. A further object of the present invention is to provide a locking assembly which uses a pistol locking mechanism or the like.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

The following detailed description is, therefore, not to be taken in a limiting sense, and the scope of the present invention is best defined by the appended claims.

BRIEF DESCRIPTION OF THE DRAWINGS

In the drawings, like elements are depicted by like reference numerals. In order that the invention may be more fully understood, it will now be described, by way of example, with reference to the accompanying drawings in which:

FIG. 1 is a cutaway view of one embodiment of the present invention shown in the locked position.

FIG. 2 is a cutaway view of one embodiment of the present invention shown in the unlocked position.

FIG. 3 is a cutaway view of a second embodiment of the present invention shown in the locked position.

FIG. 4 is a cutaway view of a second embodiment of the present invention shown in an unlocked position.

FIG. 5 is an elevation view of the rod of the second embodiment of the present invention.

FIG. 6 is a partial section view of a third embodiment of the present invention shown in the locked position.

LIST OF REFERENCE NUMERALS

With regard to reference numerals used, the following numbering is used throughout the drawings.

10 present invention
12 trailer hitch
14 elongated member
16 aperture of trailer hitch
18 handle
20 lock
22 left side of handle
24 right side of handle
26 cross member
28 loading bar
30 aperture
32 cavity
34 coiled spring
36 ball bearings
38 cavity
40 tapered plunger
42 upper tow bar
44 lower tow bar
46 tapered portion
48 tip
50 tab
52 pivot
54 tang
56 locking groove
60 eye member
62 aperture
64 upper part
66 lower part

DESCRIPTION OF THE PREFERRED EMBODIMENT(S)

Turning now descriptively to the drawings, in which similar reference characters denote similar elements throughout the several views, FIGS. 1 through 5 illustrate the present invention wherein there is disclosed a quick release hitch assembly.

Turning to FIG. 1, therein is shown a cutaway view of the present invention 10 in the locked position shown inserted through a conventional trailer hitch tow bar assembly 12 as might be found on the rear of a towing vehicle having an elongated member 14 passing through an aperture 16 of the trailer hitch tow bar. Further, the tow bar 12 is sandwiched between a conventional upper 42 and lower 44 tow bar tongue disposed on the front of the implement being towed. The elongated member 14 has an upper handle member 18, suitable for receiving the hand of a user, located on its upper end having a lock means 20 communicating with a rod handle cross member 26 passing from one side 22 of the handle 18 to the second side 24 having a rod handle cross member 26 thereon. Cross member 26 has a groove 45 on each of its ends for receiving and slidably connecting with sides 22, 24. Lock means 20 serves to space apart cross member 26 from handle member 18 so that when lock means 20 is unlocked by using a key and thereafter removed, cross member 26 is free to slide on groove 45 toward handle member 18, thereby allowing rod 28 to move outwardly toward handle member 18. Lock means 20 is of standard design as would be done by one skilled in the art and, also shown is an elongated rod member 28 which passes through a smaller bore 30 of the elongated member 14 which smaller bore 30 terminates into a larger bore being an inner chamber 32 within which bores 30, 32 rod 28 and plunger 40 reciprocate. Rod 28 has a coiled spring 34 disposed in chamber 32 which surrounds and runs longitudinally along rod 28 for tensioning and urging rod 28 and plunger 40 inwardly of the elongated member 14. Also shown are a pair of locking ball bearings 36 positioned in grooves or apertures 38 on the periphery of the elongated member 14 having a tapered plunger 40 on the inner bore 32 of the elongated member 14. Grooves 38 are tapered and have a slightly greater diameter toward the center of member 14 so that the balls 36 are held in the apertures 38 in such a manner which prohibits the balls 36 from falling out of apertures 38 due to the outer diameter of aperture 38 being slightly less than the diameter of balls 36. In the locked position, plunger 40 is positioned between balls 36 so as to urge balls 36 outwardly or laterally so that the distance from the outer edge of one ball 36 to the outer edge of the second ball 36 is slightly greater than the diameter of tow bar aperture 16 so that the elongated member 14 can not be removed from aperture 16 thus locking the trailer hitch 12 in place. Lock 20 is positioned between cross member 26 and top of handle 18 so as to keep rod 28 inwardly disposed relative to handle 18 and thus keep plunger 40 between balls 36 and the member 14 in the locked position.

Turning to FIG. 2, therein is shown a cutaway view of the present invention shown in the unlocked position. Shown are features disclosed in FIG. 1. However, the lock is removed so that handle 26 can be slidably moved toward the top of handle 18 thereby moving plunger 40 upwardly in cavity 32 thereby allowing balls 36 to move inwardly toward the center of elongated member 14 and thereby reducing the distance between the outer edges of the balls 36 to a distance slightly less than the diameter of aperture 16 which allows the elongated member 14 to be removed from aperture 16 allowing the tow bar 12 to be separated from tow bars 42, 44. Plunger 40 has a tapered portion 46 which terminates onto a pointed tip 48 forming a ball stop having a small diameter just large enough to keep balls 36 from falling through aperture 32.

Turning to FIG. 3, therein is shown a cutaway view of a second embodiment of the present invention. As can be seen, this embodiment is similar to that of FIGS. 1 and 2, except that instead of rod 28 having plunger 40 on its lower end, rod 28 has eye-like loop member 60 having and aperture 62 therein (see FIG. 5 for a better view). Furthermore, a pair of tab members 50 having pivots 52 thereon and further having a tang 54 thereon for contacting the underside of tow bar member 44 so as to prevent removal of elongated member 14 from the tow bar aperture 16. Tabs 50 each have a locking groove 56 in the upper end for receiving the upper part of aperture/loop 60 of rod 28 which serves to lock the tabs 50 in an extended or operative position for locking the hitch.

Turning to FIG. 4, therein is shown a cutaway view of a second embodiment of the present invention shown in an unlocked position. Shown are the features of FIG. 3 with the rod 28 moved upwardly due to the removal of lock 20. It can be seen that tabs 50 pivot inwardly toward the center of elongated member 14 thereby allowing removal of member 14 from aperture 16.

Turning to FIG. 5, therein is shown an elevation view of the rod 28 of the second embodiment having an eye-like, looped member 60 located on its lower end having an aperture 62 therein having an upper part 64 and a lower part 66.

Turning to FIG. 6, therein is shown a partial section view of a third embodiment of the present invention shown in the locked position. Shown is a slightly different design from FIGS. 3 and 4, wherein the tabs 50 do not have notch 56 for locking. Instead, the upper part 64 of looped member 60 is held in a lowered position between tabs 50 by spring 34 which keeps the tangs 54 in a locked position. Tabs 50 are released to the unlocked position when spring 34 in moved outwardly by rod 28 when cross member 26 is moved outwardly by the hand of the user.

What is claimed to be new and desired to be protected by letters patent is set forth in the appended claims.

I claim:

1. An apparatus for a trailer hitch pin for placement in a trailer hitch, comprising:

a) an elongated pin member having an internal bore running therethrough, said bore having a smaller diameter upper portion, said bore further having a larger diameter lower portion, said elongated member positionable in generally the upright position passing through the trailer hitch;

b) a handle suitable for use by a human hand disposed on the upper end of said elongated pin member;

c) a rod disposed internal of said elongated pin member, said rod extending from said handle to the lower end of said elongated pin member;

d) said elongated pin member having a spring positioned in its larger diameter lower portion surrounding said rod, said spring urging said rod outwardly from said elongated pin member;

e) said rod having a crossmember positioned on the upper end of said rod, said crossmember communicating between said rod and said handle, said crossmember forming a space therein between said crossmember and said handle, a means for locking disposed in said space whereby said rod is locked in position;

f) a means for securing said elongated pin member in the trailer hitch whereby said elongated pin member cannot be removed from the trailer hitch;

g) a elongated looped member disposed on the lower end of said rod, said elongated looped member having an aperture therein, said aperture having an upper part and a lower part; and, h) a pair of oppositely opposed tabs disposed in the aperture of said elongated looped member, wherein each of said tabs are pivotally attached in and extended through oppositely facing walls of said elongated pin member.

2. The apparatus of claim 1, said tabs having pivots on the lower ends thereof, said pivots operating so that said tabs pivot in the vertical plane, said tabs having grooves for receiving the upper end of said elongated looped member whereby said elongated pin member is secured when said tab is in a locked first position, said tabs having a tang thereon for contacting the underside of the trailer hitch so that the elongated pin member cannot be removed from the trailer hitch when said tab is in said locked first position, said elongated pin member having said means for locking disposed in said space between said crossmember and said handle in said locked first position.

3. The apparatus of claim 2, wherein when said tabs are in an unlocked second position, said grooves of said tabs bypass the upper end of said elongated looped member whereby said elongated pin member is unsecured when said tab is in said unlocked second position, said elongated pin member having said lock removed from said space between said crossmember and said handle in said unlocked second position.

4. The apparatus of claim 1, said elongated pin member having a pair of oppositely opposed tabs disposed on the lower end of said elongated pin member, said tabs disposed in oppositely facing walls of said elongated pin member, said tabs having pivots on the lower ends thereof, said pivots operating so that said tabs pivot in the vertical plane, said tabs being pivoted to a spaced apart relationship for receiving the upper end of said elongated looped member whereby said elongated pin member is secured when said tab is in a locked first position, said tabs having a tang thereon for contacting the underside of the trailer hitch so that the elongated pin member cannot be removed from the trailer hitch when said tab is in said locked first position, said elongated pin member having said lock disposed in said space between said crossmember and said handle in said locked first position.

5. The apparatus of claim 4, wherein when said tabs are in an unlocked second position, said tabs bypass the upper end of said elongated looped member whereby said elongated pin member is unsecured when said tab is in said unlocked second position, said elongated pin member having said lock removed from said space between said crossmember and said handle in said unlocked second position.

* * * * *